United States Patent [19]
Watson, Jr.

[11] 3,752,381
[45] Aug. 14, 1973

[54] ULTRASONIC SOLDERING APPARATUS
[75] Inventor: James J. Watson, Jr., Bethel, Conn.
[73] Assignee: Branson Instruments, Incorporated, Stamford, Conn.
[22] Filed: Mar. 17, 1972
[21] Appl. No.: 235,602

[52] U.S. Cl. .................. 228/1, 29/503, 117/130, 118/400, 228/36
[51] Int. Cl. ............................................. B23k 1/06
[58] Field of Search .................. 228/1, 33, 36, 37, 228/40; 29/470.1, 502, 503; 117/130; 118/400

[56] References Cited
UNITED STATES PATENTS
3,249,281  5/1966  St. Jean ........................... 228/1 X
3,277,566  10/1966  Christensen ..................... 29/471.1
3,303,983  2/1967  Patrick et al. ........................ 228/37
3,430,332  3/1969  Roczey-Koller ................. 228/37 X
3,536,243  10/1970  Higgins ............................... 228/37

Primary Examiner—J. Spencer Overholser
Assistant Examiner—Robert J. Craig
Attorney—Ervin B. Steinberg

[57] ABSTRACT

An ultrasonically activated molten metal bath is constructed for providing joints between the return bends of radiators. The ultrasonic apparatus includes an electro-acoustic converter fitted with a bifurcated horn which extends through the bottom of the tank holding a quantity of molten metal.

8 Claims, 7 Drawing Figures

Patented Aug. 14, 1973
3,752,381
3 Sheets-Sheet 1
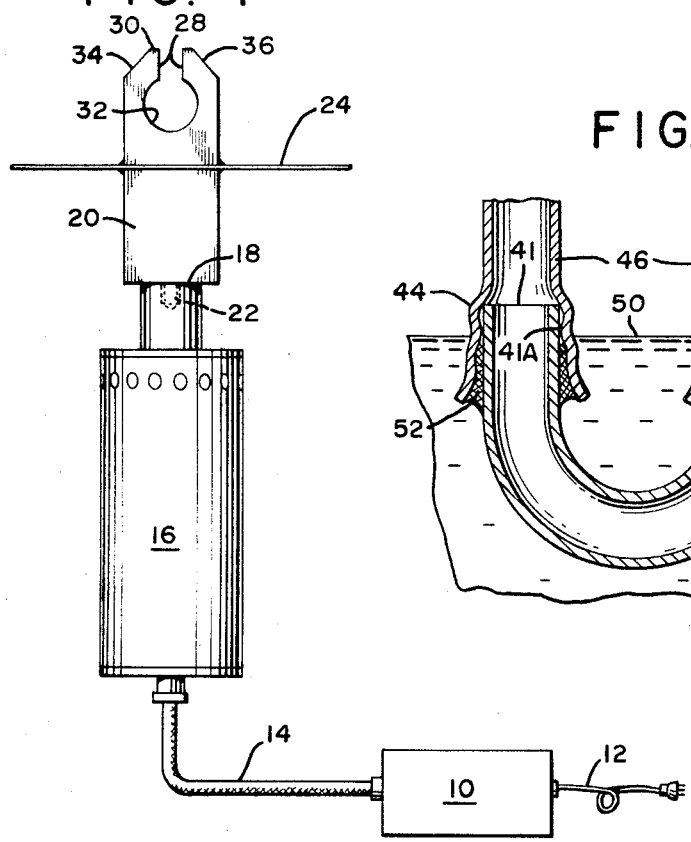

ULTRASONIC SOLDERING APPARATUS

BRIEF SUMMARY OF THE INVENTION

The joining of metal parts by means of an ultrasonically activated solder bath is described in U.S. Pat. No. 2,397,400 issued to Heinz Barwich, entitled "Apparatus for and Method of Producing Metallic Coatings" dated Mar. 26, 1946.

The apparatus and method described in the above stated patent are particularly applicable to soldering aluminum where a tenacious oxide film must be displaced in order to obtain wetting of the workpiece surface by the molten metal. Ultrasonic soldering apparatus and methods have found wide-spread application also in those fields where fluxless soldering is required, typically electronic circuit component boards, see "Ultrasonics in Mass Soldering" by Ernest A. Gutbier, The Western Electric Engineer, January 1969; Vol. XIII, No. 1.

The invention described hereafter refers specifically to an apparatus adapted for soldering the return bends of aluminum coolers or radiators. The use of aluminum instead of copper has become very attractive due to the steady price rise of copper raw material and the difficulty experienced from time to time to obtain adequate supplies of copper. Moreover, aluminum being lightweight metal offers a definite weight advantage over copper or copper alloys.

As has been indicated above, joining aluminum parts by solder is afflicted with difficulty and the use of flux material for displacing oxide film frequently causes pockets and impurities which interfere with the requirement for a fluid-tight joint. The ultrasonic process of joining two sections of aluminum tubing is particularly suited for producing a reliable and fluid-tight junction, and the arrangement described hereafter discloses a combination of elements which achieves this result in a relatively simple, expedient and convenient manner.

The principal feature of the present invention concerns an apparatus for joining aluminum tubings by means of an ultrasonically activated molten metal bath. The ultrasonic energy is provided by a bifurcated horn which is dimensioned to receive therein the workpiece portion to be joined, in the present example the return bend tube of a cooler or radiator assembly. The horn is mounted to protrude through the bottom of the tank which contains the molten bath, the frontal portion of the horn terminating slightly below the surface of the molten metal bath.

Other important features of the present invention will be more clearly apparent by reference to the following description when taken in conjunction with the accompanying drawing.

BRIEF DESCRIPTION OF THE DRAWING

FIG. 1 is a plan view of the ultrasonic converter unit and special horn in accordance with the present invention;

FIG. 2 is a perspective view of the horn;

FIG. 3 is a vertical sectional view of the return bend portion of a radiator assembly;

DETAILED DESCRIPTION OF THE INVENTION

Figure 4:
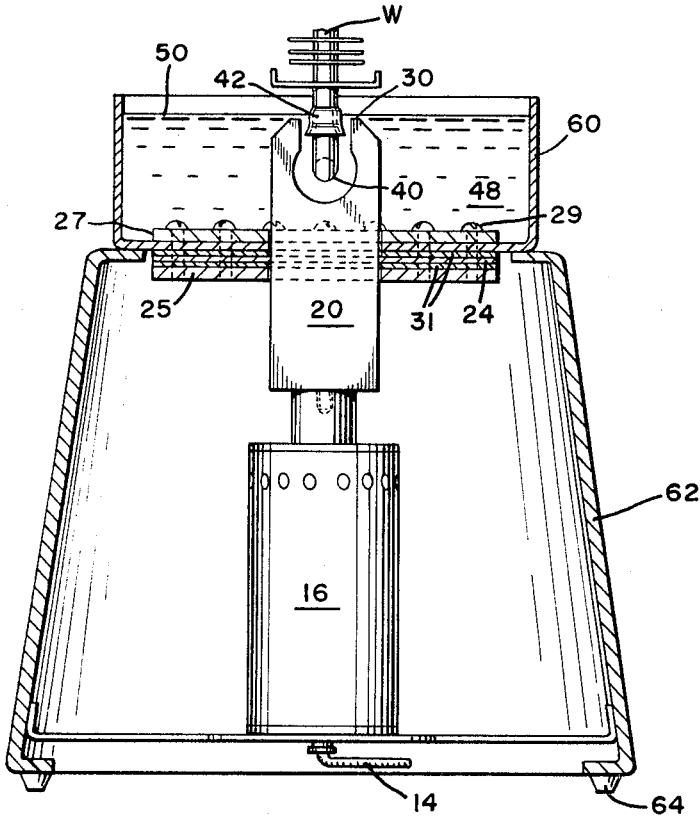
FIG. 4 is a vertical view, partly in section, of a preferred embodiment of the present apparatus.

Referring now to the figures and FIGS. 1 and 2 in particular, numeral 10 identifies an electrical high frequency generator which receives electrical energy at power line voltage and frequency from a cable 12 and transmits high frequency electrical energy via a cable 14 to an electro-acoustic transducer assembly 16. The high frequency may be in the range from 1 to 100 kHz, but most suitably is in the range from about 16 to 50 kHz. The electro-acoustic converter unit converts the applied electrical high frequency energy to mechanical vibration which is apparent at an output surface 18. In order to convert the electrical energy to mechanical vibration, piezoelectric or magnetostrictive transducing means are employed and a converter unit suitable for this purpose using piezoelectric transducing means is described, for instance, in U.S. Pat. No. 3,328,610 issued to S. E. Jacke et al., entitled "Sonic Wave Generator" granted on June 27, 1967.

A horn 20, also called resonator, tool, mechanical amplitude transformer, etc., see "Ultrasonic Engineering" (book) by Julian R. Frederick, published by John Wiley & Sons, Inc., New York, N. Y. (1965) pages 87 through 102 is mechanically coupled with its input surface to the converter unit 16 by means of a threaded stud 22, see FIG. 2.

The horn 20 is dimensioned to be one-half wavelength long at the predetermined frequency of sound travelling longitudinally therethrough. The horn, in a typical example, is fabricated from steel and has a rectangular cross-sectional area. A rectangular flange 24 is welded to the horn 20 substantially at the horn's nodal region. The flange is provided with a plurality of screw holes 26 whose purpose will be evident below. The output portion of the horn is bifurcated, that is, a slot 28 extends from the frontal surface 30 of the horn 20 rearwardly toward the nodal region and, in a preferred embodiment, the slot is horseshoe shaped, having a radius 32. This shape avoids undue mechanical stress concentration and also directs ultrasonic energy toward the center of the circular portion. In order to accentuate the directing of ultrasonic energy toward the center of the partial circle, the narrow sides 34 and 36 of the horn are inclined in a converging direction.

FIG. 3 shows a typical return bend portion of an aluminum radiator which is to be joined in a molten metal bath. Numeral 40 identifies the U-shaped return bend tubing which telescopically mates with flared or bell-shaped portions 42 and 44 of radiator tubings 46. It will be understood by those skilled in the art that a typical radiator has a plurality of such return bends. Joining is accomplished by submersing the respective radiator portion with return bend in a liquid metal bath 48, such as liquid solder, whose surface level is indicated by the line 50. The liquid metal will fill the space between the tubing 40 and the flared tube portions 42 and 44 as is indicated at 52 and upon withdrawing the radiator assembly from the metal bath the molten metal will solidify and provide a metallic joint. It is important that the liquid level 50 be not permitted to rise above the end surface 41 of the tubing 40 as otherwise molten metal could overflow and fill the inside of the return tubing 40. In fact, as has been indicated, the end portion 41 and a curved portion 41A of the flared parts 42 and 44 disposed slightly below the end surface 41 attempt to provide a closure in order to inhibit rising of the liquid metal within the radiator tubings. As stated previously, the method of using flux for achieving an aluminum to aluminum solder joint is not satisfactory due to the liklihood of contamination, inclusions, and other factors which interfere with a fluid-tight joint. Test results have shown that the use of ultrasonic energy for activating the molten solder is eminently satisfactory for providing a metal to metal aluminum joint in the absence of any flux.

A preferred embodiment of the invention is shown in FIG. 4 wherein the tank 60 contains a quantity of molten metal 48, such as solder. The metal tank 60 is supported by an enclosure 62 which rests on a set of feet 64. The converter unit 16 is mounted within the enclosure 62 and the horn 20 extends through an aperture in the bottom plate of the tank 60 so that the frontal surface 30 of the horn is disposed slightly below the surface level 50 of the molten metal bath. The flange 24 serves to provide a liquid-tight joint between the tank bottom plate and the horn 20 protruding therethrough. Sealing is accomplished by means of a pair of clamping plates 25 and 27, a set of screws 29 which extend through the holes 26 in the flange 25, and a set of intermediate flat gasket sheets 30 made of a mixture of silicone rubber and asbestos such as are available under the name of "Klingerit" from the H. S. White Company, 251 19th Street, Brooklyn, N.Y. The slot 28 in the frontal portion of the horn 20 is of a width to accommodate therein the workpiece W, in the present case being the return bend tubing 40 and flared portions 42 and 44 of a conventional aluminum radiator assembly W. For providing a liquid-tight metal joint, the several return bends of the radiator assembly W are sequentially disposed in the slot of the horn 20 as shown and the generator 10 is briefly activated to provide ultrasonic energy from the horn 20 to the liquid 48. When the horn is resonant, the ultrasonic energy is transmitted to the metal bath and is directed toward the return tubing 40 by virtue of the shape of the slot 28 of the horn, causing an intense scrubbing action of the molten metal in contact with the radiator metal surface. This action causes a wetting of the aluminum surface and thereby provide a sound metallurgical bond. For the sake of simplicity, the heating means for the solder, thermostatic control means for the solder and the cooling means for the converter unit 16 have been omitted from the drawing.

It will be apparent that the level 50 of the molten bath, the frontal portion of the horn 20 and the workpiece W must be disposed relative to each other as has been explained in connection with FIG. 3.

Figure 5:
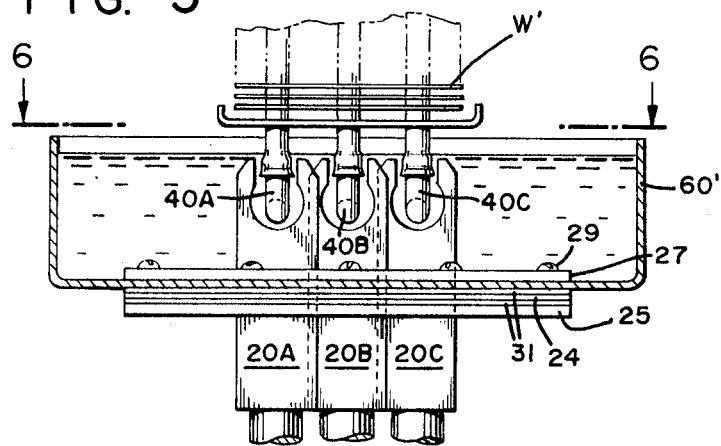
FIG. 5 is a vertical view, partly in section, of an alternative embodiment using a plurality of ultrasonic assemblies.
Figure 6:
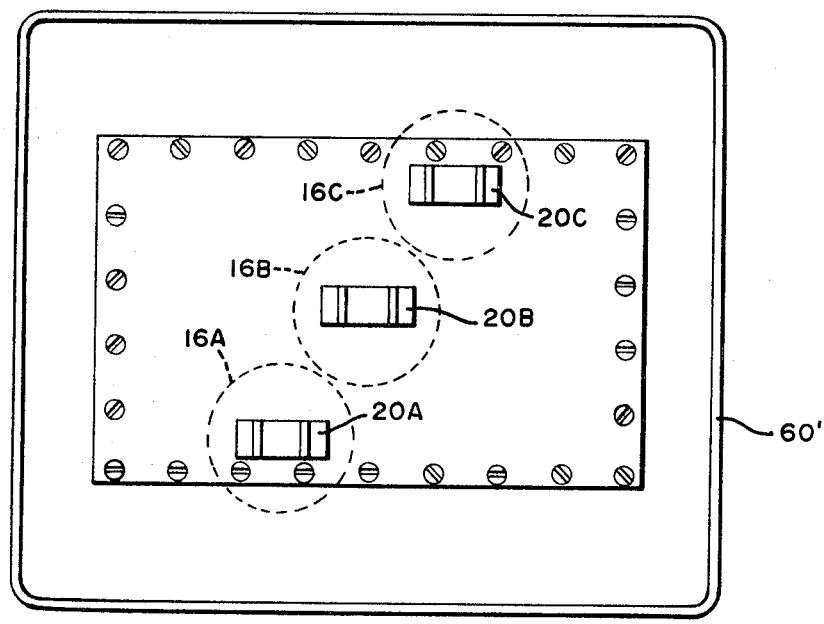
FIG. 6 is a plan view taken along lines 6—6 in FIG. 5.
Figure 7:
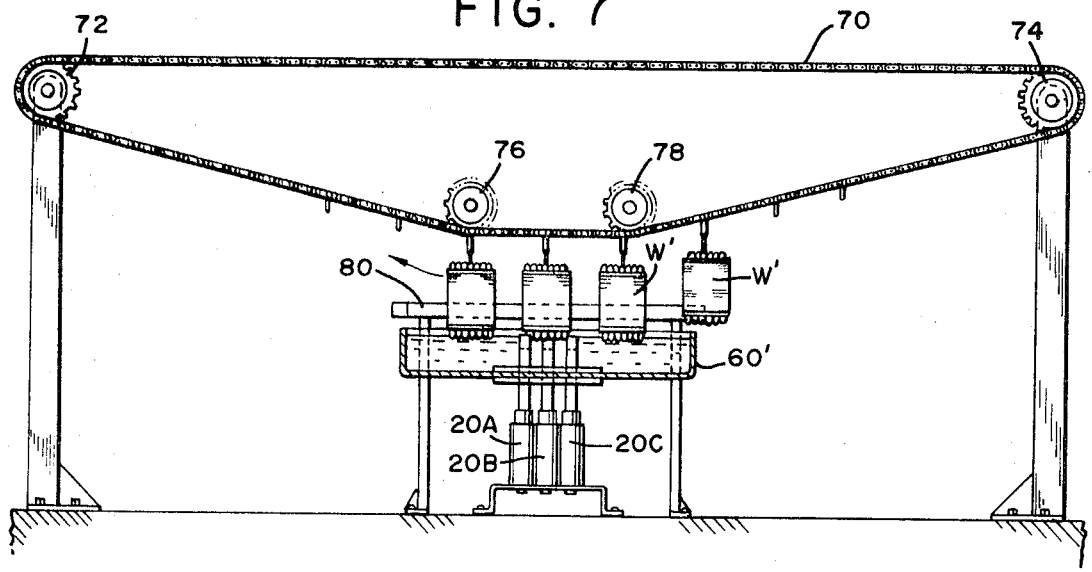
FIG. 7 is a vertical view, partly schematic, of the embodiment per FIG. 5, showing transport means for conveying radiator assemblies through the molten metal bath.

The embodiment shown in FIG. 4 serves for exposing only a single return tubing or single joint to the action of ultrasonic energy. In most instances a radiator has a plurality of return tubings disposed in parallel rows and side by side relation as is indicated in FIG. 5 wherein the radiator W' is depicted with a plurality of return bends 40A, 40B and 40C. In order to process radiators of this type in a single path through a molten liquid bath, a tank 60' is equipped with an array of staggered ultrasonic energy sources, each such source comprising a respective converter unit 16A, 16B and 16C, see FIGS. 6 and 7. Each converter unit, in turn, is provided with a respective horn 20A, 20B and 20C, each being of the configuration shown in FIGS. 1 and 2. The respective horns extend through the tank bottom and are sealed in a liquid-tight manner by respective flange and gasket structures 25, 27, 29 and 31 as shown in greater detail in FIG. 4. A conveyor 70 rotated about rollers 72 and 74 and guide rollers 76 and 78 is adapted to carry a plurality of radiators W' in a single path through the molten bath causing all the return tubes disposed on one side of the respective radiator to be exposed sequentially to the ultrasonically activated molten metal to achieve a joint. The radiators are guided between a set of spaced rails 80, only one being visible in FIG. 7. It will be apparent to those skilled in the art that the placing of the ultrasonic horns is adjusted to correspond to the spacing of the rows of return bends on the radiator and that the horns are staggered in the direction of radiator travel trhough the bath.

What is claimed is:

1. An ultrasonic apparatus comprising:
   a tank adapted to contain a bath of molten metal; an electro-acoustic converter;
   a horn adapted to resonate as a half wavelength resonator at a predetermined frequency coupled to said converter;
   means mounting said horn substantially at its nodal region of longitudinal motion through the bottom of said tank to extend into said tank, causing the frontal portion of said horn to be in contact with the molten metal below the surface thereof and responsive to electrical energy of predetermined frequency applied to said converter imparting sonic energy to said metal bath, and
   a slot of horseshoe type configuration and a width sufficient to receive therein a workpiece to be treated by the sonically excited molten metal bath disposed in said horn, said slot extending from the frontal surface of said horn by a predetermined distance rearwardly toward said nodal region.

2. An ultrasonic apparatus as set forth in claim 1, the frontal portion of said horn being of substantially rectangular cross-section.

3. An ultrasonic apparatus as set forth in claim 1, said means mounting said horn comprising a flange secured to said horn substantially at its nodal region, an aperture in said bottom of said tank, and means sealing said flange in liquid-tight relation to said bottom of said tank.

4. An ultraosnic apparatus as set forth in claim 1, said horn having a substantially rectangular cross-sectional area, and the narrow surfaces of the frontal portion of said horn being convergingly inclined relative to one another.

5. An ultrasonic apparatus as set forth in claim 1, said slot being of a width sufficient to receive therein the U-shape return bend of radiators.

6. An ultrasonic apparatus comprising:
   a tank adapted to contain a bath of molten metal;
   a plurality of electro-acoustic converters;
   a horn adapted to resonate as a half wavelength resonator at a predetermined frequency coupled to each of said converters;
   means mounting said horns in a staggered array substantially at their respective nodal regions of longitudinal motion through the bottom of said tank to extend into said tank, causing the frontal portion of each horn to be in contact with the molten metal below the surface thereof and, responsive to electrical energy of predetermined frequency applied to said converters, imparting sonic energy to said metal bath, and each horn having a slot of horseshoe type configuration and a width sufficient to receive therein a workpiece to be treated by the sonically excited molten metal bath, each slot extending from the frontal surface of a respective horn by a predetermined distance rearwardly toward the respective nodal region of the corresponding horn.

7. An ultrasonic apparatus as set forth in claim 6, said converters being adapted to operate at substantially the same frequency.

8. An ultrasonic apparatus as set forth in claim 7, said converters operating at a predetermined frequency in the range from 1 to 100 kHz.

* * * * *